July 29, 1947.  V. A. MARCO  2,424,573
TELL-TALE AND TESTING LIGHT
Filed Feb. 24, 1943  2 Sheets-Sheet 1
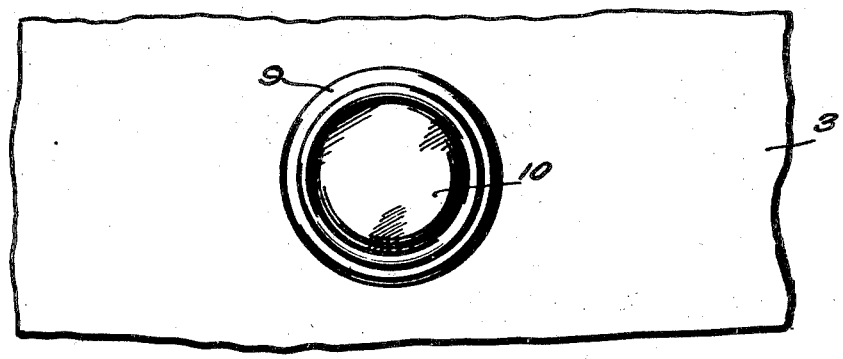
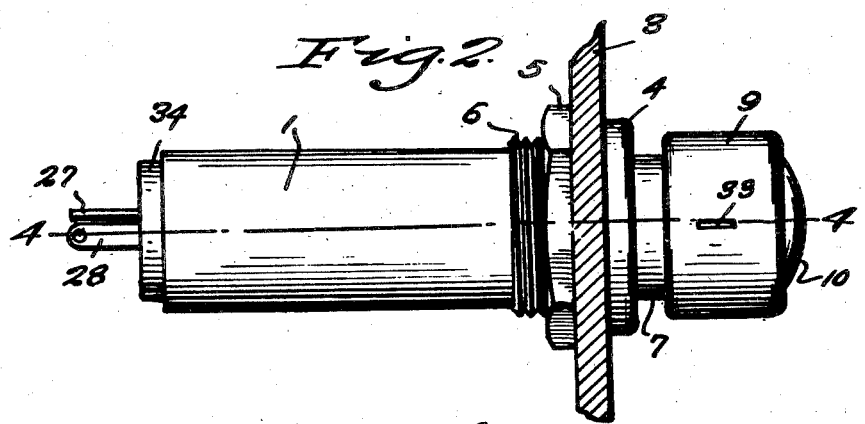
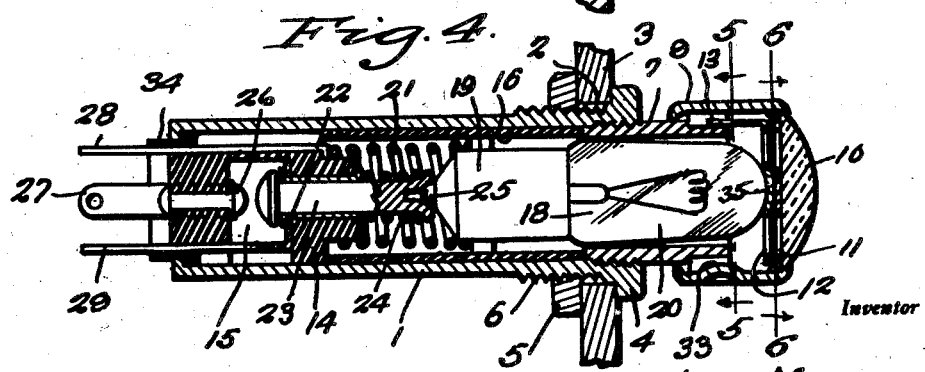
Inventor
Vincent Anthony Marco
By Clarence A. O'Brien
and Harvey B. Jacobson
Attorneys July 29, 1947. V. A. MARCO 2,424,573
TELL-TALE AND TESTING LIGHT
Filed Feb. 24, 1943 2 Sheets-Sheet 2
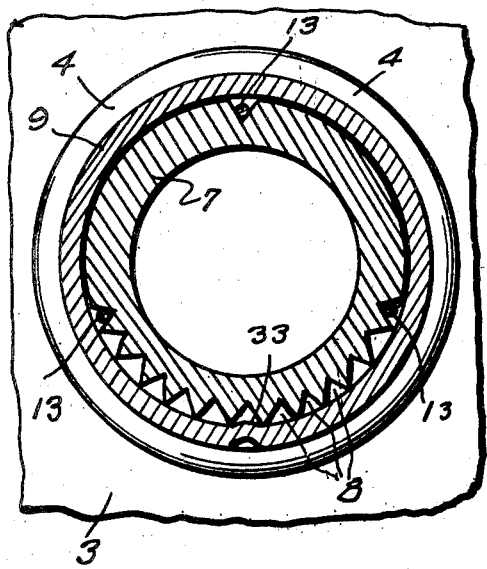
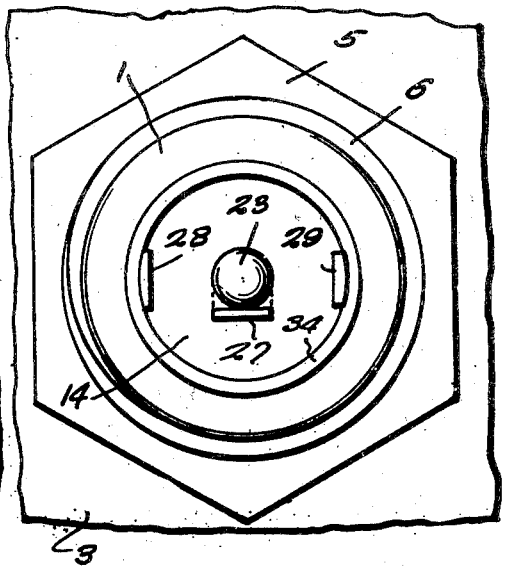
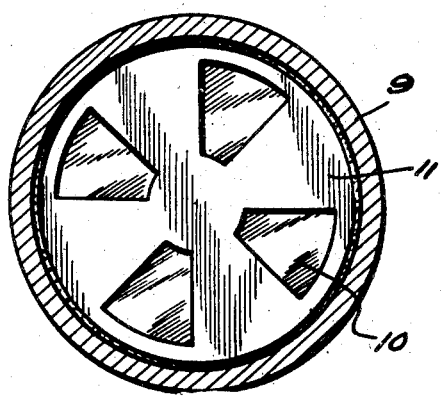
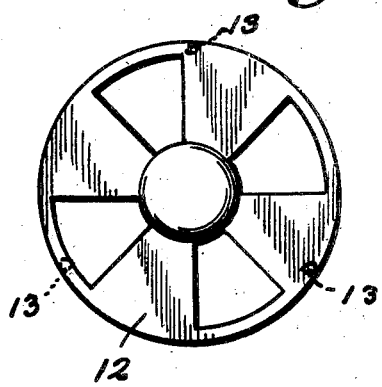
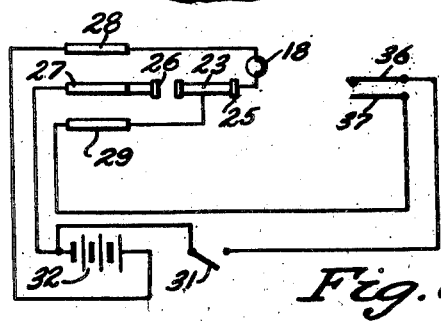
Inventor
Vincent Anthony Marco Patented July 29, 1947

2,424,573

UNITED STATES PATENT OFFICE 2,424,573

TELL-TALE AND TESTING LIGHT

Vincent Anthony Marco, Beverly Hills, Calif.

Application February 24, 1943, Serial No. 476,955

4 Claims. (Cl. 177—311)

The present invention relates to a combination tell-tale and testing light, and has for one of its important objects to provide, in a manner as hereinafter set forth, a device of this character comprising novel circuit-controlling means.

Another very important object of the invention is to provide a combination tell-tale and testing light of the character described which embodies unique means whereby the tell-tale or indicator lamp may be conveniently dimmed if desired.

Other objects of the invention are to provide a tell-tale and testing light of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in front elevation of a combination tell-tale and testing light constructed in accordance with the present invention.

Figure 2 is a view in side elevation of the device.

Figure 3 is a rear elevational view.

Figure 4 is a longitudinal sectional view taken substantially on the line 4—4 of Figure 2.

Figures 5 and 6 are cross sectional views, taken substantially on the lines 5—5 and 6—6, respectively, of Figure 4.

Figure 7 is a detail view in elevation of one of the shutters.

Figure 8 is a diagrammatic view of an electric circuit embodying the invention.

Referring now to the drawing in detail, it will be seen that the embodiment of the invention which has been illustrated comprises a tubular housing 1 of suitable material and dimensions. The tubular housing 1, which is open at its ends, is adapted to be mounted in an opening 2 which is provided therefor in a support, such as a panel 3. Toward this end, the housing 1 is provided, on its forward end, with an external flange 4 which abuts the front of the panel 3. Then, a nut 5 is threaded on the portion 6 of the housing 1 for engagement behind the panel 3 for firmly securing said housing in position.

Threadedly mounted in the forward portion of the tubular housing 1 and projecting longitudinally therefrom is removable neck or extension 7. The neck 7 comprises peripheral, longitudinal teeth 8 (see Fig. 5) on its forward end portion.

A rim or the like 9 is rotatably and slidably mounted on the neck 7. A lens 10 is mounted in the rim 9. Also fixed in the rim 9, in back of the lens 10, is a shutter 11. A shutter 12 is cooperable with the shutter 11. In the embodiment illustrated, the shutter 12 includes a plurality of fingers 13 which are slidably engageable between the teeth 8 for positively securing said shutter 12 against rotation.

An insulating block 14 is mounted in the rear end portion of the housing 1. The insulating block 14 is formed to provide a chamber 15. Forwardly of the block 14, a cylindrical insulator 16 is mounted in the tubular housing 1. An electric lamp 18 is slidably and removably mounted in the neck 7 and projects forwardly into the member 9. The cylindrical insulator 16 encircles the base or shell 19 of the lamp 18. The bulb 20 of the lamp 18 is engaged with the shutter 12. A coil spring 21 in the housing 1 has one end engaged with the insulating block 14 and its other end engaged with the lamp 18 for yieldingly urging said lamp forwardly.

A bushing 22 is mounted in the forward portion of the insulating block 14. A plunger contact 23 is slidably mounted in the bushing 22. A coil spring 24 yieldingly engages the slidable plunger contact 23 with the base contact 25 of the lamp 18. Mounted in the rear end portion of the insulating block 14 is a stationary contact 26 with which the plunger contact 23 is engageable. An electric connection or terminal 27 is provided for the contact 26. Electric connections or terminals 28 and 29 are mounted longitudinally on the insulator 14. The element 29 is electrically connected to the bushing 22. Of course, the bushing 22 is of conducting material. The element 28 is electrically connected to the shell contact 19 of the lamp 18 through the coil spring 21.

In Figure 8 of the drawing, there are shown diagrammatically main and testing electric circuits which may be used. In this illustration, a fixed contact 36 and a movable contact 37 are in the main circuit. A manually operable switch 31 of conventional construction is provided in the main circuit at any suitable point to control the flow of current to contact 36. A source of electric current, such as a storage battery, is indicated at 32. As an example, contact 34 may engage contact 33 when an airplane landing gear is lowered.

It is thought that the operation of the device will be readily apparent from a consideration of the foregoing. Briefly, when the lamp 18 is to be used as a tell-tale signal, the switch 31 is closed for completing the main circuit in which the contacts 36 and 37 are interposed. Should the lamp 18 fail to light, it may be ascertained whether or not the failure is due to burning out of the lamp 18 of due to failure of the landing gear to lower and cause contact 34 to engage contact 33, by pushing the assembly, slidably mounted in the neck 7, inwardly or longitudinally, thus sliding the lamp 18 inwardly against the tension of the coil spring 21. In this manner the plunger 23 is moved inwardly or rearwardly against the tension of the coil spring 24 into engagement with the contact 26, thereby completing the testing circuit through lamp 18 but excluding contacts 33 and 34. Of course, when the rim 9, et cetera, is released, the testing circuit is immediately opened by the coil springs 21 and 24. For dimming the lamp 18, the rim 9 is rotated on the neck 7, thus turning the shutter 11 relative to the shutter 12. An inwardly pressed rib 33 on the rim 9 is engageable between the teeth 8 for securing said rim in the position to which it is rotatably adjusted for controlling the brilliance of the lamp 18. The retaining rib 33 rides over the teeth 8 and snaps therebetween upon rotation of the rim 9. An insulating thimble 34 is mounted in the rear end portion of the housing 1 and projects therefrom. A concavity 35 in the stationary shutter 12 accommodates the bulb 20 of the lamp 18.

It is believed that the many advantages of a combination tell-tale and testing light constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A combination tell-tale and testing light comprising a tubular housing having a projecting end, a cap slidable on the projecting end of said housing and having a lens, an insulating block mounted in the housing, a fixed contact mounted in said block, a plunger contact of conducting material slidably mounted in the block and engageable with the fixed contact, an electric lamp slidably mounted in the housing and including a base contact engaged with the plunger contact, means yieldingly urging the plunger toward the lamp, said cap being operable for manually sliding the lamp in one direction for engaging the plunger contact with the fixed contact, and resilient means in the housing for sliding the lamp and cap in the opposite direction and maintaining them engaged.

2. A combination tell-tale and testing light comprising a tubular housing having a projecting end, a cap slidable on the projecting end of said housing and having a lens, means for mounting said housing on a support, an insulating block having a chamber therein and mounted in the housing, a fixed contact mounted in one end portion of the block, a bushing of conducting material mounted in the other end portion of the block in alignment with the fixed contact, a plunger contact of conducting material slidably mounted in the bushing and engageable with the fixed contact, an electric lamp slidably mounted in the housing and including a base contact engaged with the plunger, a coil spring operatively connected to the plunger for yieldingly urging same toward the lamp, a coil spring operatively connected to the lamp for yieldingly urging same into engagement with the cap, said cap being operable for manually moving the lamp and plunger contact for engaging said plunger contact with the fixed contact, means for electrically connecting a conductor to the fixed contact, means for electrically connecting a conductor to the shell contact of the lamp, and means for electrically connecting a conductor to the bushing.

3. A light of the character described comprising a flanged tubular housing, an insulating block fixed in one end of the housing, a stationary contact fixed axially in one end of the block, a plunger contact slidably mounted in axial alignment with the fixed contact in the other end of said block, a spring normally maintaining said plunger contact out of engagement with said fixed contact, separate terminal connections to said contacts and said housing, an electric lamp slidably mounted in the housing having a base contact in engagement with said plunger contact, a cap slidable on the housing and holding said lamp against outward movement, a spring urging said lamp into engagement with said cap, said cap being movable axially of the housing to cause said plunger contact to engage said fixed contact to complete an auxiliary circuit.

4. A combination signal and circuit testing light comprising a flanged tubular housing for mounting in an apertured support, an insulating block fixed in one end of the housing, a fixed contact mounted axially of the block at one end thereof, a plunger contact slidably mounted in the other end of said block in axial alignment with said fixed contact, resilient means normally holding the plunger contact in an outwardly projected position and away from the fixed contact, an electric lamp slidably mounted in one end of the housing and having a base contact engaged with said plunger contact, means slidable on the housing for restraining said lamp from outward displacement, and a spring disposed between said insulating block and said lamp urging the lamp into engagement with said slidable restraining means, said restraining means being movable axially of the housing to move the plunger contact into engagement with said fixed contact to complete an auxiliary circuit.

VINCENT ANTHONY MARCO.

REFERENCES CITED

The following references are of record in the file of this patent:

UNITED STATES PATENTS

| Number | Name | Date |
|---|---|---|
| 2,265,257 | Wight | Dec. 9, 1941 |
| 2,103,560 | Smith et al. | Dec. 28, 1937 |
| 2,134,696 | Bigman | Nov. 1, 1938 |
| 2,091,155 | Merkel | Aug. 24, 1937 |
| 790,548 | Atwood | May 23, 1905 |
| 1,194,386 | Horton | Aug. 15, 1916 |
| 1,349,651 | Bartlett | Aug. 17, 1920 |
| 1,798,049 | Urfer | Mar. 24, 1931 |
| 2,324,384 | Grimes | July 13, 1943 |
| 1,935,467 | Beer et al. | Nov. 14, 1933 |
| 1,998,072 | Blake et al. | Apr. 16, 1935 |
| 2,234,954 | Bergman | Mar. 18, 1941 |
| 2,355,149 | De Giers | Aug. 8, 1944 |